(12) United States Patent
Mazziotti et al.

(10) Patent No.: US 10,451,248 B2
(45) Date of Patent: Oct. 22, 2019

(54) ARRANGEMENT OF A LAMP ON A REFLECTOR OF A LIGHTING DEVICE FOR A VEHICLE

(71) Applicant: Hella GmbH & Co. KGaA, Lippstadt (DE)

(72) Inventors: Pietro-Antonio Mazziotti, Lippstadt (DE); Michael Schonlau, Schlangen (DE); Libor Renda, Usov (CZ)

(73) Assignees: Hella GmbH & Co. KGaA, Lippstadt (DE); HELLA AUTOTECHNIK NOVA S.R.O., Mohelnice (CZ)

( * ) Notice: Subject to any disclaimer, the term of this patent is extended or adjusted under 35 U.S.C. 154(b) by 0 days.

(21) Appl. No.: 15/558,451

(22) PCT Filed: Feb. 3, 2016

(86) PCT No.: PCT/EP2016/052235
§ 371 (c)(1),
(2) Date: Sep. 14, 2017

(87) PCT Pub. No.: WO2016/146300
PCT Pub. Date: Sep. 22, 2016

(65) Prior Publication Data
US 2018/0135832 A1 May 17, 2018

(30) Foreign Application Priority Data

Mar. 16, 2015 (DE) .......................... 10 2015 103 821
May 7, 2015 (DE) .......................... 10 2015 107 137

(51) Int. Cl.
*B60Q 1/00* (2006.01)
*F21S 45/50* (2018.01)
(Continued)

(52) U.S. Cl.
CPC .............. *F21V 7/00* (2013.01); *B60Q 1/0088* (2013.01); *F21S 41/192* (2018.01);
(Continued)

(58) Field of Classification Search
CPC .......... B60Q 1/0088; F21V 7/00; F21S 45/50; F21S 41/336; F21S 41/162; F21S 41/194; F21S 41/192
See application file for complete search history.

(56) References Cited

U.S. PATENT DOCUMENTS 5,010,455 A    4/1991  Luallin et al.
6,082,883 A *  7/2000  Tatsumi ................ F21S 41/192
                                                    362/548
(Continued)

FOREIGN PATENT DOCUMENTS

DE    102004045369 A1    3/2006
EP         0893647 A2    1/1999
(Continued)

*Primary Examiner* — Arman B Fallahkhair
(74) *Attorney, Agent, or Firm* — Dinsmore & Shohl LLP

(57) ABSTRACT

An illumination device for a vehicle includes a reflector having a rear-side lamp opening and a protective collar formed around the lamp opening. The protective collar has an inner diameter and has a cut-out of a peripheral segment. A lamp has a lamp axis and is configured to be received in the lamp opening by an introduction movement in a direction of the lamp axis and a rotary movement about the lamp axis. The rotary movement of the lamp about the lamp axis defines a rotational space of the lamp. An electrical contact plug element is configured to connect to the lamp. The inner diameter is slightly larger than the rotational space defined by the lamp. The cut-out of the protective collar is configured to receive the plug element such that the plug element is disposed through the cutout peripheral segment when connected to the lamp.

10 Claims, 3 Drawing Sheets

(51) Int. Cl.
*F21V 7/00* (2006.01)
*F21S 41/19* (2018.01)
*F21S 41/162* (2018.01)
*F21S 41/33* (2018.01)

(52) U.S. Cl.
CPC .......... *F21S 41/194* (2018.01); *F21S 45/50* (2018.01); *F21S 41/162* (2018.01); *F21S 41/336* (2018.01)

(56) References Cited

U.S. PATENT DOCUMENTS

| | | | | |
|---|---|---|---|---|
| 6,643,777 | B1* | 11/2003 | Chu | G06F 21/71 |
| | | | | 726/16 |
| 6,773,155 | B1* | 8/2004 | Yashiki | B60Q 1/007 |
| | | | | 362/548 |
| 6,817,885 | B2* | 11/2004 | Josquin | F21S 41/192 |
| | | | | 439/374 |
| 7,476,014 | B1* | 1/2009 | McCarthy | B60Q 1/0088 |
| | | | | 362/519 |
| 9,863,594 | B2* | 1/2018 | Landcastle | B60Q 1/0058 |
| 2003/0202360 | A1 | 10/2003 | Trimpe et al. | |
| 2013/0272010 | A1 | 10/2013 | Kawamura | |

FOREIGN PATENT DOCUMENTS

| | | | |
|---|---|---|---|
| EP | 1043546 | A2 | 10/2000 |
| EP | 1288566 | A2 | 3/2003 |
| EP | 1637803 | A2 | 3/2006 |
| JP | H10172303 | A | 6/1998 |

* cited by examiner

ARRANGEMENT OF A LAMP ON A REFLECTOR OF A LIGHTING DEVICE FOR A VEHICLE

CROSS-REFERENCE TO RELATED APPLICATIONS

This application is the U.S. National Phase of PCT/EP2016/052235 filed Feb. 3, 2016, which claims priority of German Patent Application 102015103821.8 filed Mar. 16, 2015, and German Patent Application 102015107137.1 filed May 7, 2015.

FIELD OF THE INVENTION

The present invention relates to an arrangement of a lamp on a reflector of an illumination device for a vehicle and to such an illumination device, wherein the arrangement is executed by means of a rear-side mounting of the lamp in a lamp opening of the reflector, comprising an introduction movement in the direction of a lamp axis and a rotary movement about the lamp axis, and wherein a plug element for an electric contact is arrangeable at the lamp.

BACKGROUND

US 2013/0272010 A1 shows an arrangement of a lamp on a reflector of an illumination device for a vehicle and a collar is arranged at the reflector and the lamp opening is located at the end side at the collar. A ring mount is screwed onto the collar that enables the creation of a bayonet mount for fastening the lamp. The lamp is placed into the ring mount and is secured by a rotary movement. The arrangement of the lamp at the rear side on the reflector consequently comprises an introduction movement in the direction of a lamp axis followed by a rotary movement about the lamp axis. The bayonet mount is thus created and the lamp can be mounted at the ring mount without further aids by the lamp mount connected by a bayonet mount. The ring mount disadvantageously forms a single part that first has to be screwed onto the collar at the reflector. It is furthermore a disadvantage that the lamp can carry out a return revolution in an uncontrolled manner so that it can fall out of the lamp opening. The disadvantage further arises that the lamp can be incorrectly inserted by an operator, in particular when a visual inspection of the correct arrangement of the lamp in the lamp opening is not possible due to the installation situation of the illumination device. Depending on the embodiment of the bayonet mount, the lamp may be inserted in a skewed manner or the lamp is not even introduced to a sufficient depth into the lamp opening.

DE 10 2004 045 369 A1 shows a further arrangement of a lamp on a reflector, wherein the reflector has a protective collar at its rear side that partly surrounds the lamp opening. If the lamp is introduced into the lamp opening by an introduction movement in the direction of the lamp axis and if the rotary movement about the lamp axis is subsequently executed, contact tabs arranged at the lamp face in the direction of a contact plug that is movably guided on a holder. The contact plug is pushed along the holder toward the contact tabs at the lamp until the electric contact is established. The mounting of the contact plug on the holder is of a complex design in this respect and the holder is laterally molded to the protective collar of the reflector. A security against rotation of the lamp is created by the contact of the contact plug with the contact tabs such that said lamp cannot be unintentionally released from the reflector since a return revolution of the lamp about the lamp axis is prevented by the contact tabs projecting into the contact plug.

FIG. 1 shows the rear side of a reflector 11 of an illumination device for a vehicle and a lamp opening 12 into which a lamp, not shown, is inserted is introduced in the reflector 11. The lamp opening 12 is surrounded by a protective collar 15 that primarily serves to form protection for the lamp and to prevent a penetration of water into the lamp opening. The protective collar 15 surrounds the lamp opening 12 on a segment of approximately 180°, with a lamp into which a plug element has already been inserted for an electric contact also being able to be introduced into the lamp opening 12 and being able to be rotated therein. A release of the lamp from the reflector 11, that is to be prevented, can disadvantageously arise due to a return revolution of the lamp about the lamp axis.

SUMMARY OF THE INVENTION

The object of the invention is the further development of an arrangement of a lamp on a reflector, wherein the arrangement is to be executed in a simple manner and the arrangement is intended to prevent the lamp from being incorrectly inserted and to prevent an inserted lamp from being unintentionally released.

This object is achieved by the respective characterizing features starting from an arrangement of a lamp on a reflector as discussed herein and starting from an illumination device as discussed herein. Advantageous further developments of the invention are discussed herein.

The invention includes the technical teaching that a protective collar is formed around the lamp opening and has a cut-out on a peripheral segment that is adapted to the plug element and through which the plug element can be led toward the lamp.

The key feature of the invention is a configuration of the protective collar with an adapted cut-out that is designed such that when a plug element is connected to the lamp, the lamp can no longer be released. The release of the lamp with a connected plug element is achieved in that the plug element directly abuts the margin of the cut-out when the lamp undergoes a rotary movement in the lamp axis that is directed against the rotary movement toward the fastening of the lamp by a bayonet mount in the lamp opening. On the other hand, the lamp cannot be introduced into the lamp opening with an already connected plug element since a collision of the plug element with the protective collar would result. The result is a high security against an incorrect installation of the lamp since on the activation of the lamp, for example as part of a quality control of the correct arrangement of the lamp at the reflector, said activation can only take place with a plugged-in plug element. Since the plug element can only be plugged in when the lamp is in the correct position, it is ensured that the lamp is properly inserted in the lamp opening on a successful activation of said lamp.

The protective collar forms improved protection against the penetration of moisture into the lamp opening due to the above-described security function so that the moisture can also only reach the lamp to a lesser extent. The protective collar in this respect projects over the lamp at least in part and the lamp with the molded plug-in contact is seated substantially within the protective collar. An improved security against mechanical influence on the lamp consequently results since the protective collar surrounds the lamp, in particular including the plug-in contact, on the rear side of the lamp.

A particularly advantageous embodiment results when the plug element has a plug width to which the cut-out is adapted. The width of the cut-out, in particular the segment angle in relation to the lamp axis over which the cut-out in the protective collar extends, should have a width that is slightly larger than the plug width. The plug can thus be delivered from the outside through the cut-out perpendicular to the lamp axis until the plug element is connected to the plug-in contacts of the lamp. The plug element is thus seated in the cut-out and a rotation of the lamp about the lamp axis in the lamp opening is effectively prevented. The lamp can then only be removed when the plug element has previously been released from the lamp again since only then is a rotary movement of the lamp about the lamp axis made possible.

The peripheral segment of the cut-out in relation to the lamp axis has a segment angle, for example, of 45° to 100°, preferably of 50° to 95°, and particularly preferably of 60° to 90°. The segment angle is thus considerably below 180° since only then is a rotation of the lamp with a connected plug element effectively prevented.

The lamp, for example, has plug-in contacts that project laterally with respect to the lamp axis and that face into the cut-out in a mounted position. If the lamp is in the operating position after the establishing of the bayonet mount of the lamp in the lamp opening, the plug-in contacts in particular face centrally into the cut-out and the plug element can be plugged onto the plug-in contacts of the lamp.

A particular advantage results when the protective collar is formed in one piece with the reflector. An advantage in particular results when the reflector forms an injection molded component so that the protective collar is manufactured in one piece with the reflector in an injection molding process. It is thereby avoided that additional components are required that form the lamp opening in which the lamp is inserted. The lamp opening is introduced directly in the injection molded body of the reflector in accordance with yet a further embodiment and the protective collar rises above the lap opening introduced in the reflector. An individual part that forms a security against rotation of the lamp in the lamp opening is furthermore also not necessary due to the single-part formation of the protective collar with the reflector. Plastics or metals are preferably used as injection molding materials so that the reflector with the protective collar forms a single-part plastic injection molding body, a metal injection molding body or a metal pressure die casting body.

A further improvement of the arrangement results when a holding dome/alignment element is arranged in the region of the cut-out on the outer side of the reflector on which the plug element can be supported and which in particular prevents a plugging of the plug element to an incorrectly mounted lamp. The holding dome can also be designed as elongate in the form of a bridge or the holding dome forms a step at the outer side of the reflector. The holding dome in this respect serves the mechanical support of the plug element such that the plug element is held in a lateral direction by the margin of the cut-out in the protective collar and the plug element is supported by the holding dome on the lower side. Mechanical influences on the plug element can consequently be substantially taken up by the protective collar and by the holding dome. A rib can in particular be provided on the holding dome that prevents a plugging of the plug element to the lamp if the lamp has been incorrectly inserted into the lamp opening.

The cut-out in the protective collar can be U-shaped or the cut-out is O-shaped such that the protective collar runs through over its total periphery on the peripheral upper side edge. The plug element can then be inserted into a window-like cut-out in the protective collar. A support of the plug element in the direction toward the lamp axis thereby also results, for example when there is a pulling force on the electric leads.

The protective collar further advantageously has an inner diameter that is slightly larger than the rotational space of the lamp on the rotary movement about the lamp axis. A guidance effect to guide the lamp during the rotary movement in the lamp opening can thereby be achieved; a guidance effect by the protective collar is in particular created to introduce the lamp properly into the lamp opening. The guidance effect is in particular advantageous when the insertion of the lamp into the lamp opening has to take place in a hidden, not visible, region on a vehicle.

Finally, the plug element includes a retaining element such that the plug element can be arranged on the lamp in a self-retaining manner, with it also being conceivable that the plug element can be mechanically held at the margin of the cut-out of the protective collar, for example by snap-in elements or the like.

The invention furthermore relates to an illumination device having a reflector and having a lamp, in particular for a vehicle, wherein the lamp is arranged in a lamp opening of the reflector and wherein the arrangement is executed by an introduction movement in the direction of a lamp axis and by a rotary movement about the lamp axis, and wherein a plug element for an electric contact is arrangeable at the lamp. Provision is made in accordance with the invention in this respect that a protective collar is formed around the lamp opening and has a cut-out on a peripheral segment which is adapted to the plug element and through which the plug element can be led toward the lamp. The further features and associated advantages that have been descried above in connection with the arrangement of the lamp at the reflector in particular also apply to the protective collar in connection with the claimed illumination device.

BRIEF DESCRIPTION OF THE DRAWINGS

Further measures improving the invention will be shown in more detail below together with the description of a preferred embodiment of the invention with reference to the Figures. There are shown.

DETAILED DESCRIPTION OF THE INVENTION

Figure 1:
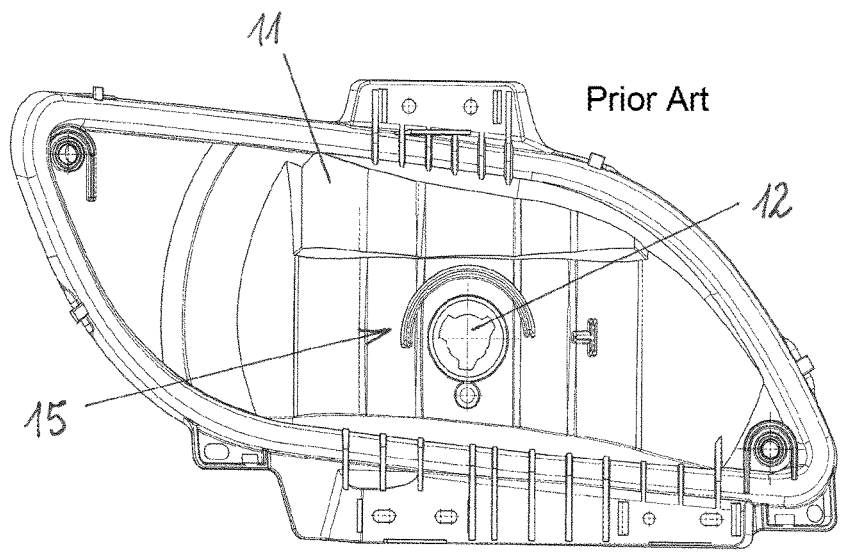
FIG. 1 is a rear view of a reflector having a lamp opening for mounting a lamp in accordance with the prior art.

FIG. 1 shows a reflector 11 having a lamp opening 12 introduced in the reflector, with the lamp opening 12 being surrounded by a protective collar 15 in accordance with the prior art.

Figure 2:
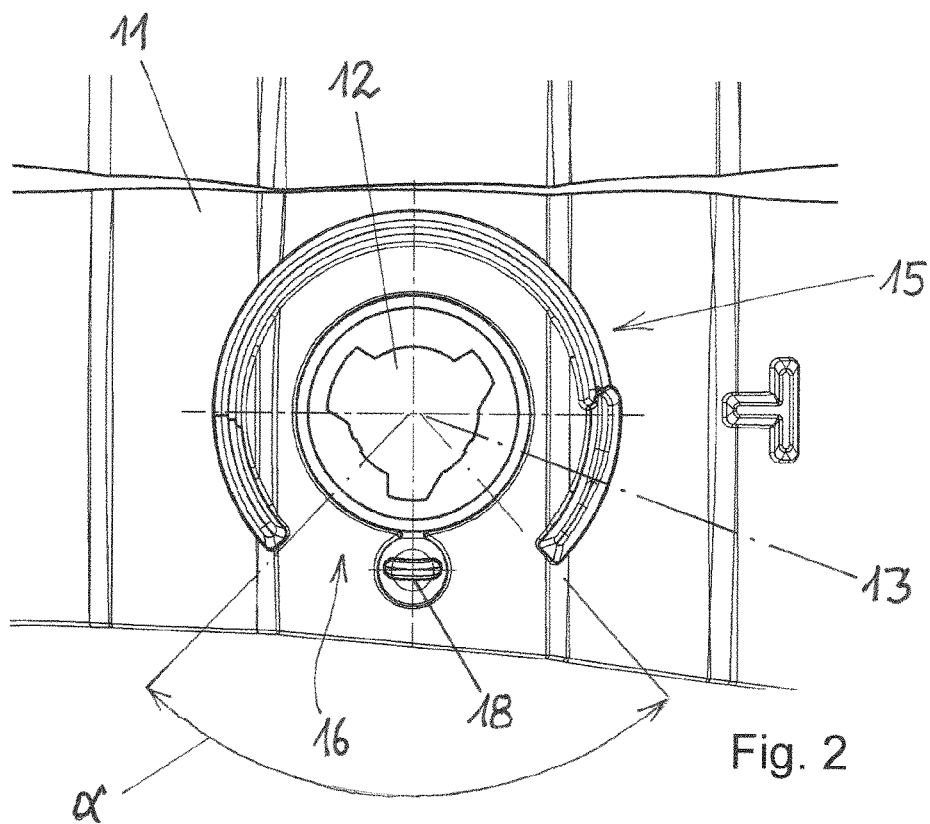
FIG. 2 is a rear view of a reflector having a protective collar that is configured with the features of the invention.

FIG. 2 shows details of the rear side of the reflector 11 in the region of the lamp opening 12, with a protective collar 15 having the features of the present invention being shown. The protective collar 15 surrounds the lamp opening 12 over a substantial peripheral region so that only a segment-wise cut-out 16 remains in the protective collar 15 through which a plug element can be led toward the lamp 10. The cut-out 16 has a segment angle α that has a value of, for example, approximately 85°. The segment angle α is in this respect applied with respect to the lamp axis 13. The protective collar 15 consequently surrounds the lamp opening 12 at an angle of approximately 275°. The lamp opening 12 has a contour that enables a bayonet-mounted fastening of a lamp in the lamp opening 12.

A holding dome 18 is located centrally in the region of the cut-out 16 on the rear side of the reflector 11. If a plug element is inserted in the region of the cut-out, the plug element can lie on the holding dome 18 at the end face so that the holding dome 18 forms a mechanical support of the plug element.

Figure 3:
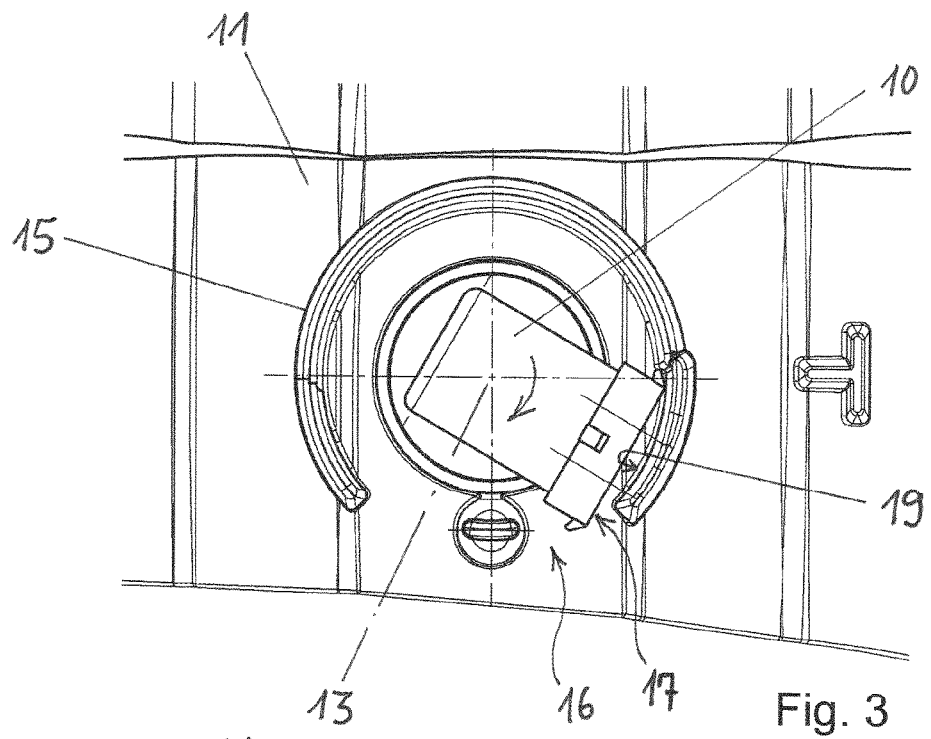
FIG. 3 is a view of the reflector in accordance with the invention in accordance with FIG. 2 having a lamp inserted into the lamp opening prior to an executed rotary movement.
Figure 4:
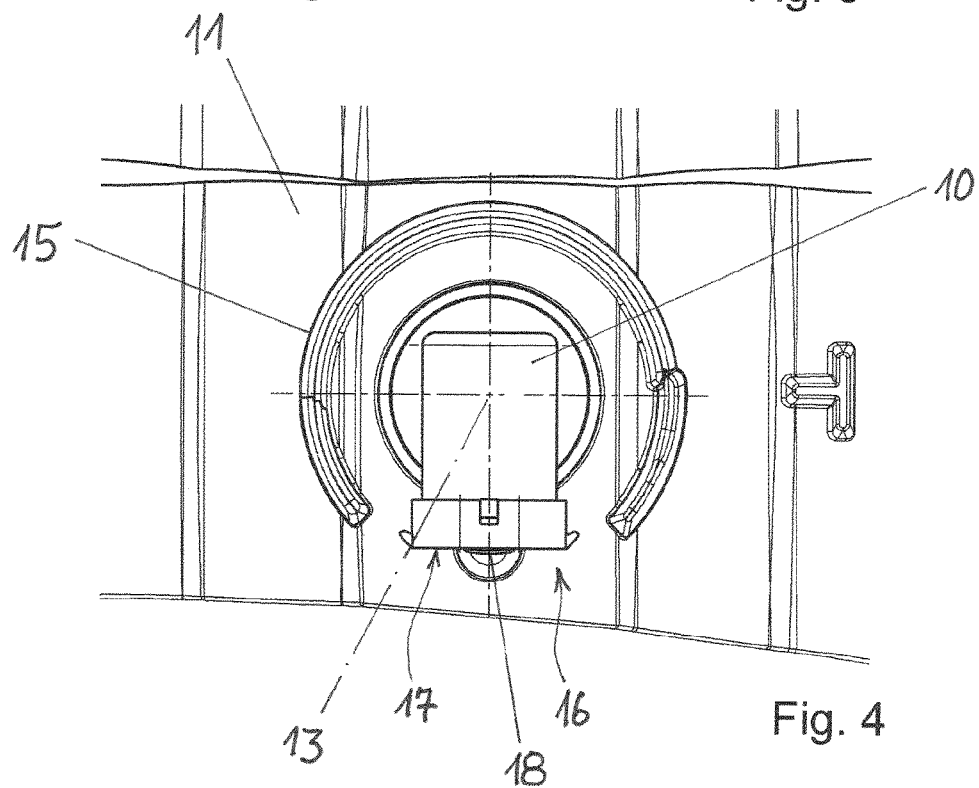
FIG. 4 is a view of the reflector having the inserted lamp in accordance with FIG. 3, with a rotary movement of the lamp having been executed about the lamp axis.

FIGS. 3 and 4 show the rear side of the reflector 11 with a lamp 10 that is shown at the rear side so that substantially or mainly a view of the plug-in contact 17 of the lamp 10 is possible. FIG. 3 shows the lamp 10 in a rotary position about the lamp axis 13 in which the lamp 10 is first introduced into the lamp opening by an introduction movement. As shown by the arrow, the lamp 10 is rotated about the lamp axis 13 until the opening of the plug-in contact 17 is seated centrally in the cut-out 16, as shown in FIG. 4. The cut-out 16 in the protective collar 15 in this respect has an opening width that only enables a plugging of a plug element into the plug-in contact 17 of the lamp 10 in the rotated position of the lamp 10 shown in FIG. 4. The representation in FIG. 4 furthermore shows a seating of the lamp 10, in particular of the plug-in contact 17, on the holding dome 18 that is molded to the rear side of the reflector 11.

The protective collar 15 has a guide region 19 that is adapted to the length of the plug-in contact 17. When the lamp 10 is inserted in the lamp opening, the guide region 19 guides the lamp 10 via a sliding of the plug-in contact 17 on the inner side of the guide region 19. The guide region 19 has a diameter jump such that the guide region 19 forms a slightly larger diameter than the remaining protective collar 15. An operator is thus prevented from making an incorrect rotation of the lamp 10 in the lamp opening and the lamp 10 can only be rotated clockwise in the lamp opening, as a comparison of FIGS. 3 and 4 shows.

Figure 5:
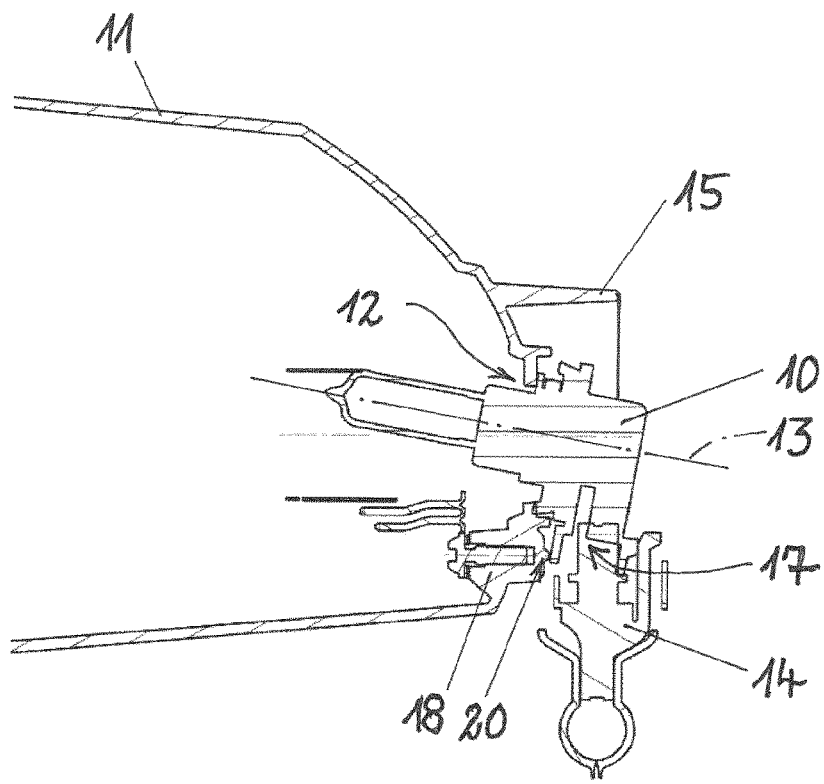
FIG. 5 is a sectional view of the reflector with an incorrectly inserted lamp.

FIG. 5 shows the reflector 11 with a lamp 10 incorrectly inserted into the lamp opening 12, as can be seen from the slanted extent of the lamp axis 13. A plugging of the plug element 14 into the plug-in contact 17 of the lamp 10 is prevented by a rib 20 provided on the holding dome/ alignment element 18 since said rib makes a placement of the plug element 17 onto the plug-in contact 17 geometrically impossible due to the incorrect arrangement of the lamp 10. Only when the lamp 10 is correctly inserted into the lamp opening 12 can the plug element 17 be plugged on since the rib 20 on the holding dome/alignment element 18 releases the plug-in region of the plug element 14 and is thus no longer disturbing.

Figure 6:
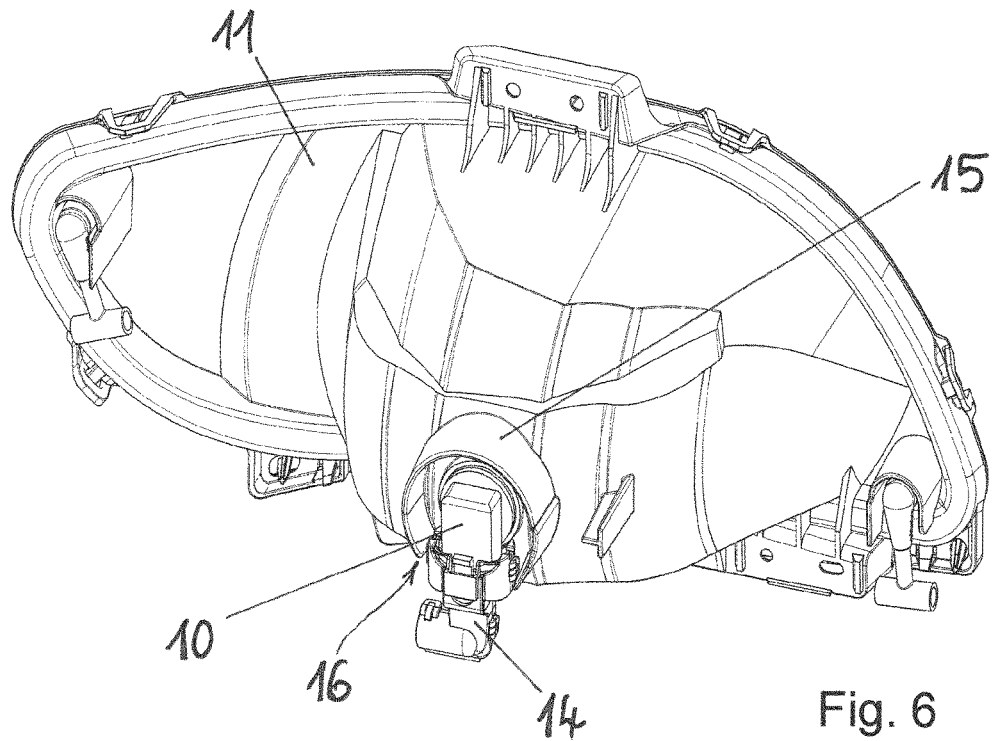
FIG. 6 is a perspective view of the reflector with a correctly inserted lamp and with a plug element attached to the lamp.

Finally, FIG. 6 shows a perspective view of the reflector 11 from a rear side and a lamp 10 is inserted in the lamp opening. The protective collar 15 surrounds the lamp 10 substantially fully peripherally and forms a cut-out 16 in which a plug element 14 is seated in the lamp 10.

The invention is not restricted in its design to the preferred embodiment provided above. A number of variants is rather conceivable that also makes use of the solution shown with generally differently designed embodiments. All the features and/or advantages, including any construction details, spatial arrangements, and method steps, originating from the claims, the description or the drawings can be essential to the invention both per se and in the most varied combinations.

REFERENCE NUMERAL LIST 10 lamp
11 reflector
12 lamp opening
13 lamp axis
14 plug element
15 protective collar
16 cut-out
17 plug-in contact
18 holding dome
19 guide region
20 rib
α segment angle

The invention claimed is:

1. An illumination device for a vehicle, comprising: a reflector having a rear-side lamp opening and a protective collar formed around and extending from a periphery of the lamp opening, the protective collar having a guide region next to a segment-wise cut-out region, an inner diameter of the guide region of the protective collar being slightly greater than an inner diameter of a remaining portion of the protective collar; a lamp having a lamp axis, the lamp configured to be received in the lamp opening by an introduction movement in a direction of the lamp axis and a rotary movement about the lamp axis, the rotary movement of the lamp about the lamp axis defining a rotational space of the lamp; and an electrical contact plug element provided in the segment-wise cut-out region of the protective collar and configured to connect to the lamp; wherein the inner diameter of the guide region is slightly larger than the rotational space defined by the lamp; the lamp being received at the guide region and then rotated about the lamp axis such that a plug-in contact of the lamp connects to the electrical contact plug element disposed in the segment-wise cutout region.

2. The illumination device in accordance with claim 1, wherein the plug element has a plug width generally matching the peripheral segment of the cut-out region.

3. The illumination device in accordance with claim 1, wherein the peripheral segment of the cut-out region has a segment angle in relation to the lamp axis in the range of 45° to 100°.

4. The illumination device in accordance with claim 1, wherein the peripheral segment of the cut-out region has a segment angle in relation to the lamp axis in the range of 50° to 95°.

5. The illumination device in accordance with claim 1, wherein the peripheral segment of the cut-out region has a segment angle in relation to the lamp axis in the range of 60° to 90°.

6. The illumination device in accordance with claim 1, wherein the lamp has plug-in contacts that project laterally with respect to the lamp axis and that face into the cut-out region in a mounted position.

7. The illumination device in accordance with claim 1, wherein the protective collar is formed in one part with the reflector.

8. The illumination device in accordance with claim 1, wherein the reflector is an injection molded part, with the protective collar being manufactured in one part with the reflector in an injection molding process.

9. The illumination device in accordance with claim 1, wherein the reflector has a holding dome/alignment element disposed in the segment-wise cut-out region on an outer side of the reflector, the alignment element supporting the plug element and preventing a connecting of the plug element to an incorrectly mounted lamp.

10. The illumination device in accordance with claim 1, wherein the plug element includes a retaining element such that the plug element is self-retaining when connected to the lamp.

\* \* \* \* \*